US012200110B2

(12) United States Patent
Yu et al.

(10) Patent No.: US 12,200,110 B2
(45) Date of Patent: Jan. 14, 2025

(54) ATTRIBUTE-BASED ENCRYPTION (ABE) METHOD WITH MULTIPLE TRACING ATTRIBUTE AUTHORITIES FOR CLOUD-ASSISTED INTERNET-OF-THINGS (IOT)

(71) Applicant: QILU UNIVERSITY OF TECHNOLOGY, Jinan (CN)

(72) Inventors: Jiguo Yu, Jinan (CN); Suhui Liu, Jinan (CN); Yinglong Wang, Jinan (CN); Anming Dong, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 204 days.

(21) Appl. No.: 17/951,533

(22) Filed: Sep. 23, 2022

(65) Prior Publication Data

US 2023/0019301 A1 Jan. 19, 2023

Related U.S. Application Data

(63) Continuation-in-part of application No. PCT/CN2021/082085, filed on Mar. 22, 2021.

(30) Foreign Application Priority Data

Mar. 23, 2020 (CN) .......................... 202010205738.7

(51) Int. Cl.
*H04L 9/08* (2006.01)
*H04L 9/14* (2006.01)
(52) U.S. Cl.
CPC .............. *H04L 9/0819* (2013.01); *H04L 9/14* (2013.01)
(58) Field of Classification Search
CPC ......... H04L 9/0819; H04L 9/14; H04L 9/085; H04L 9/3073; H04L 2209/16;
(Continued)

(56) References Cited

U.S. PATENT DOCUMENTS 8,559,631 B1 * 10/2013 Waters .................... H04L 9/085
  726/30
2011/0145593 A1 * 6/2011 Auradkar .............. H04L 9/0833
  713/189
(Continued)

FOREIGN PATENT DOCUMENTS

CN 104901942 A * 9/2015 ........... H04L 9/3073
CN 107682353 A * 2/2018 ........... G06F 21/602
(Continued)

OTHER PUBLICATIONS

Taeho Jung,"Privacy preserving cloud data access with multi-authorities", Published in: 2013 Proceedings IEEE INFOCOM, Date of Conference: Apr. 14-19, 2013, 9 pages (Year: 2013).*
(Continued)

*Primary Examiner* — Shahriar Zarrineh
(74) *Attorney, Agent, or Firm* — KATTEN MUCHIN ROSENMAN LLP

(57) ABSTRACT

An ABE method with multiple tracing attribute authorities: performing, by a central authority, system initialization to generate a public parameter and disclosing the public parameter; performing, by each of attribute authorities, initialization to generate a key pair, and disclosing a public key in the key pair; performing, by a data owner, symmetric encryption on plaintext data, performing ABE on a symmetric key based on a hidden access structure, and generating an integrity verification value; requesting, by a data user, a decryption key to the attribute authority according to an own attribute; restoring, by the data user in response to decryption, an access structure, generating an outsourcing decryption key, sending the outsourcing decryption key to a cloud storage center for semi-decryption; generating, by the cloud storage center, a semi-decrypted ciphertext, and feeding the semi-decrypted ciphertext back to the data user; fully
(Continued)

decrypting the semi-decrypted ciphertext according to a private decryption key.

16 Claims, 2 Drawing Sheets

(58) Field of Classification Search
CPC ... H04L 63/0435; H04L 63/123; H04L 67/06; H04L 67/1097; H04L 67/12
See application file for complete search history.

(56) References Cited

U.S. PATENT DOCUMENTS

| | | | | |
|---|---|---|---|---|
| 2016/0105279 A1* | 4/2016 | Zheng | .................. | H04L 9/14 713/171 |
| 2020/0036516 A1* | 1/2020 | Qu | ..................... | H04L 9/30 |
| 2020/0382287 A1* | 12/2020 | Camenisch | ........ | G06Q 20/3823 |

FOREIGN PATENT DOCUMENTS

| | | | | | |
|---|---|---|---|---|---|
| CN | 108040056 | A | * | 5/2018 | ......... H04L 63/0421 |
| CN | 108200063 | A | * | 6/2018 | ......... H04L 63/0428 |
| CN | 108243194 | A | * | 7/2018 | ........... G06F 16/367 |
| CN | 109246096 | A | * | 1/2019 | ......... H04L 63/0428 |
| CN | 109981601 | A | * | 7/2019 | |
| CN | 110460604 | B | * | 5/2022 | ........... G06F 21/602 |
| CN | 111447192 | B | * | 5/2022 | ......... H04L 63/0435 |
| CN | 117648706 | A | * | 3/2024 | |
| KR | 20150135717 | A | * | 12/2015 | |
| WO | WO-2021092745 | A1 | * | 5/2021 | ........... H04L 41/082 |
| WO | WO-2021190453 | A1 | * | 9/2021 | ........... G06F 21/602 |

OTHER PUBLICATIONS

Chunhua Li, "Achieving Privacy-Preserving CP-ABE Access Control with Multi-Cloud", Published in: 2018 IEEE Intl Conf on Parallel & Distributed Processing with Applications, Ubiquitous Computing & Communications, Date of Conference: Dec. 11-13, 2018, 8 pages (Year: 2018).*
M. Thangavel, "A Comparative Study of Attribute-Based Encryption Schemes for Secure Cloud Data Outsourcing", Published in: 2017 Ninth International Conference on Advanced Computing (ICoAC), Date of Conference: Dec. 14-16, 2017, 6 pages (Year: 2017).*
Nishide et al., "Attribute-based encryption with partially hidden encryptor-specific access structures", Applied Cryptography and Network Security, 5037:111, 2008 (Year: 2008).*
Hui Cui , "An efficient and expressive ciphertext-policy attribute-based encryption scheme with partially hidden access structures, revisited", Computer Networks, vol. 133, , Mar. 14, 2018, pp. 157-165 (Year: 2018).*
Qi Han, "Efficient and robust attribute-based encryption supporting access policy hiding in Internet of Things", Future Generation Computer Systems, vol. 83, , Jun. 2018, pp. 269-277 (Year: 2018).*
Hong Zhong, "Multi-authority attribute-based encryption access control scheme with policy hidden for cloud storage", Methodologies and Application, Published: Sep. 2, 2016, vol. 22, pp. 243-251, (2018), 9 pages (Year: 2018).*

* cited by examiner

ATTRIBUTE-BASED ENCRYPTION (ABE) METHOD WITH MULTIPLE TRACING ATTRIBUTE AUTHORITIES FOR CLOUD-ASSISTED INTERNET-OF-THINGS (IOT)

CROSS REFERENCE TO RELATED APPLICATION

This patent application is filed under 35 U.C.S. § 111(a) as a continuation-in-part claiming priority of the International Application No. PCT/CN2021/082085, filed Mar. 22, 2021, which claims the benefit and priority of Chinese Patent Application No. 202010205738.7, filed with the China National Intellectual Property Administration on Mar. 23, 2020, the disclosure of which is incorporated by reference herein in its entirety as part of the present application.

TECHNICAL FIELD

The present disclosure relates to the field of attribute-based encryption (ABE), and in particular to an ABE method with multiple tracing attribute authorities for cloud-assisted Internet-of-things (IoT).

BACKGROUND

Developed and extended from a conventional Internet, IoT links physical objects in a real world with a cyber world, to provide more efficient and intelligent services for people's lives. The IoT differs from the conventional network in that: the IoT encompasses a variety of IoT devices. According to Cisco's Annual Visual Networking Index, machine-to-machine (M2M) connections supporting IoT applications will account for more than half of the world's 28.5 billion connected devices by 2022. On the other hand, there are very limited heterogeneous resources of the IoT devices for storage, computation, etc. Therefore, it is increasingly important to manage data in the IoT.

Cloud-assisted IoT is proposed to resolve a contradiction between massive data of the IoT and limited storage resources of the device, specifically, massive data generated by the IoT are stored to a cloud storage center, and managed uniformly by a resource-rich cloud device. However, outsourced storage is bound to cause a series of security problems, which are solved well by data encryption. Conventional public key encryption can ensure the confidentiality of the data, but only implements one-to-one sharing, which violates an original intention of IoT design, namely providing the more efficient and intelligent services through data sharing. Presently, ABE is envisioned as a most promising method to solve the above problems. It not only ensures the security of the data, but also realizes efficient and controllable data sharing by directly handing an access right over to a data owner.

In recent years, there have been a number of ABE schemes. However, when the classic ABE scheme is applied to IoT scenarios, many problems arise. First of all, the ABE with a single attribute authority is impractical. If all attributes in the system are controlled by an authority center, the system efficiency is affected, and the blind spots in security of the system are caused. Next, the security of the ABE depends on mathematical assumptions of difficulties in most cases, which means that decryption burdens are hardly loaded by resource-limited IoT devices. Then, all ABE solutions are hindered by leakage of a decryption key, namely the abuse of the key. How to implement accountability after the abuse of the key is crucial. At last, in some special IoT scenarios such as a medical data management system for residents, the privacy of the data is even as important as the security of the data.

Therefore, how to realize secure, decryption outsourced, and leakage traced ABE with multiple attribute authorities is a technical problem to be solved.

SUMMARY

In view of the above-mentioned deficiencies, an objective of the present disclosure is to provide an ABE method with multiple tracing attribute authorities for cloud-assisted IoT, to realize secure, decryption outsourced, and leakage traced ABE with the multiple attribute authorities.

The present disclosure provides an ABE method with multiple tracing attribute authorities for cloud-assisted IoT, including the following steps: performing, by a central authority, system initialization to generate a public parameter and disclosing the public parameter; performing, by each of attribute authorities, initialization based on the public parameter to generate a key pair, and disclosing a public key in the key pair; performing, by a data owner, symmetric encryption on plaintext data according to a symmetric key to generate a first ciphertext, generating an integrity verification value according to the first ciphertext, performing ABE on the symmetric key based on a hidden access structure to generate a second ciphertext, and uploading the first ciphertext, the second ciphertext and the integrity verification value to a cloud storage center; requesting, by a data user, a decryption key to the attribute authority according to an own attribute, generating an outsourcing decryption key based on the decryption key and a restored hidden access structure, and sending the outsourcing decryption key to the cloud storage center; performing, by the cloud storage center, semi-decryption on a ciphertext according to the outsourcing decryption key to generate a semi-decrypted ciphertext and feeding the semi-decrypted ciphertext back to the data user; decrypting, by the data user, the semi-decrypted ciphertext according to a private decryption key to obtain the plaintext data; and searching, by the attribute authority through a white-box traceback algorithm in response to key leakage, an identity of a data user corresponding to a leaked key.

In the above implementation, the present disclosure performs symmetric encryption on plaintext data, which is more practical and improves an arithmetic speed compared with a conventional scheme in which ABE is directly performed on a plaintext. By performing ABE on a symmetric key based on a hidden access structure, not only is the security of the symmetric key ensured, but also one-to-many sharing of the symmetric key is realized and the privacy of the data user is protected. By performing access control on the data user through the access structure, the method allows a data user only having an attribute set satisfying the access structure to access encrypted data, and prevents an illegal user from accessing the encrypted data. The ciphertext is stored in the cloud storage center, and the ciphertext is semi-decrypted by the cloud storage center and then decrypted by the data user, so both a storage burden and a decryption burden of the data owner are relieved.

Preferably, the public parameter PP may be expressed as: PP={G, $G_T$, p, e, g, H, $H_0$, $H_1$, $H_2$}, where G and $G_T$ each may be a multiplicative group of a prime order p, and g may be a generator of G; e may be a symmetric bilinear map e:G×G→$G_T$; and H, $H_0$, $H_1$, and $H_2$ each may be a collision-resistant hash function, $H:\{0,1\} \to G$, $H_0:G_T \to \{0,1\}^{nH_0}$, $H_1:G_T \to \{0,1\}^*$, $H_2:\{0,1\}^* \to \{0,1\}^{nH_2}$.

Preferably, the performing, by a jth attribute authority $AA_j$, initialization based on the public parameter PP may include: randomly selecting three elements $h_j$, $a_j$ and $b_j$ from a group $Z_P^*$; randomly selecting, for each of attributes i in an attribute set $SAA_j$ controlled by the attribute authority $AA_j$, two elements $\alpha_i$ and $\beta_i$ from the group $Z_P^*$; and generating a key pair ($PK_{AAJ}$, $SK_{AAJ}$) of the jth attribute authority $AA_j$ according to the parameters $h_j$, $a_j$, $b_j$, $\alpha_i$ and $\beta_i$, the key pair ($PK_{AAJ}$, $SK_{AAJ}$) being expressed as:

$$PK_{AAJ} = \left(\{g^{\alpha_i}, g^{\beta_i}\}_{i \in S_{AA_j}}, g^{h_j}, g^{\alpha_j}, g^{b_j}\right)$$

$$SK_{AAJ} = \left(\{\alpha_i, \beta_i\}_{i \in S_{AA_j}}, h_j, \alpha_j, b_j\right).$$

Preferably, the performing, by a data owner, symmetric encryption on plaintext data according to a symmetric key to generate a first ciphertext may include: randomly selecting an element R from the multiplicative group $G_T$, and calculating the symmetric key $K_{sym}$ and a parameter $R_0$ based on the element R and the collision-resistant hash functions $H_0$ and $H_1$, both the symmetric key and the parameter being respectively pressed as:

$K_{sym} = H_1(R)$ and $R_0 = H_0(R);$ performing the symmetric encryption on the plaintext data MSG according to the symmetric key $K_{sym}$ to generate the ciphertext $CT_{sym}$, and generating the integrity verification value, the integrity verification value V being expressed as:

$V = H_2(R_0 | CT_{sym}).$

Preferably, the performing ABE on the symmetric key based on the hidden element R in a hidden access structure to generate a second ciphertext, the element R being used to calculate the symmetric key $K_{sym}$, may include: hiding an access structure $(M, \rho)$ according to a one-way anonymous key agreement protocol, and converting the hidden access structure $(M, \rho)$ into a linear secret sharing scheme (LSSS) access matrix, a replacement value $q_i$ for an ith attribute in the hidden access structure $(M, \rho)$ being expressed as:

$q_i = e(g^{h_j \cdot a}, H(i)),$ where, $g^{h_j}$ may be a parameter of a public key $PK_{AAJ}$ of the jth attribute authority, and $H(i)$ may be a hash value of the ith attribute; randomly selecting an element s from the group $Z_P^*$ as a shared key seed, and generating two random vectors $\vec{v}$ and $\vec{w}$, $\vec{v}$ and $\vec{w}$ being respectively expressed as:

$\vec{v} = [s, v_1, \ldots, v_n] \in Z_P^n$ $\vec{w} = [0, w_1, \ldots, w_n] \in Z_P^n.$ randomly selecting an element $p_i$ from the group $Z_P^*$ for each row $M_i$ in the access matrix, and calculating following two elements:

$\lambda_i = M_i \times \vec{v}$ $w_i = M_i \times \vec{w};$ and performing the ABE on the element R to generate the ciphertext $CT_{ABE}$, the ciphertext $CT_{ABE} = (h, C_0, \{C_{1,i}, C_{2,i}, C_{3,i}, C_{4,i}, C_{5,i}\}_{i \in [1,l]})$ being expressed as:

$h = g^a$ $C_0 = R \cdot e(g, g)^s$ $C_{1,i} = g^{\lambda_i} g^{\alpha_{\rho_i} p_i}$ $C_{2,i} = g^{p_i}$ $C_{3,i} = g^{w_i} g^{\beta_{\rho_i} p_i}$ $C_{4,i} = g^{a_j p_i}$ $C_{5,i} = g^{b_j p_i}.$ Preferably, the requesting, by a data user, a decryption key to the attribute authority according to an own attribute may include: making a data user registered to the central authority; and feeding, by the central authority, an identity back to a legal data user, the identity including an identity number GID and an attribute set $S_{GID}$; requesting, by the data user, the decryption key to the attribute authority, the attribute authority generating the decryption key for a controlled attribute in the attribute set $S_{GID}$, and a decryption key $sk_{\{GID,j\}} = (K_{1,i}, K_{2,i}, K_{3,i})$ generated by the jth attribute authority for the data user having the identity number of GID being expressed as:

$$K_{1,i} = g^{\frac{\alpha_i}{a_j + GID + b_j}} H(GID)^{\frac{\tau_i}{a_j + GID + b_j}}$$

$K_{2,i} = H(i)^{h_j}$ $K_{3,i} = r$ where, an element r may be an element randomly selected from a group $$Z_P \setminus \left\{-\frac{a_j + GID}{b_j}\right\};$$

and combining the decryption key corresponding to the attribute authority to form a final decryption key $S_{GID}$.

Preferably, the generating, by the data user, an outsourcing decryption key based on the decryption key and a restored hidden access structure may include: restoring, by the data user, the hidden access structure, a restored value $q_i'$ of the ith attribute in the restored hidden access structure being expressed as:

$q_i' = e(h, H(i)^{h_j});$ searching, by the data user, a subscript set $L' = \{i : (\rho_{(i)} \cap S'_{GID})_{i \in [1]}\}$ of decrypting attributes in the attribute set $S_{GID}$ according to the restored access structure; and randomly selecting an element z from the group $Z_P^*$, and calculating an outsourcing decryption key pair $ok_{GID}$ based on the element z, the outsourcing decryption key pair $ok_{GID} = (opk_{GID}, osk_{GID})$ being expressed as:

$$opk_{GID} = \left(\left\{K_{1,i}^{\frac{1}{z}}\right\}_{i \in L'}, g^{\frac{1}{z}}, H(GID)^{1/Z}\right)$$

$osk_{GID} = z.$

Preferably, the semi-decrypted ciphertext CT' may be expressed as:

$$CT' = \prod_{i=1}^{l} Q^{c_i} = e(g, g)^{s/z}$$

$$Q = \frac{e\left(g^{\frac{1}{z}}, C_{1,i}\right) e\left(H(GID)^{\frac{1}{z}}, C_{3,i}\right)}{e\left(g^{\frac{\alpha i}{z(aj+GID+bj\cdot r)}} H(GID)^{\frac{\beta}{z(aj+GID+bj\cdot r)}}, C_{2,i}^{K_3} C_{4,i} C_{5,i}^{K_{4,i}}\right)},$$

where, a constant $\{c_i\}_{i \in [1,l]} \in Z_P$, and the constant $\{c_i\}_{i \in [1,l]} \in Z_P$ may satisfy $\Sigma_{i=1}^{l} c_i M_i = [1, 0, \ldots, 0]$.

Preferably, the decrypting, by the data user, the semi-decrypted ciphertext according to a private decryption key may include: calculating, by the data user, the element R according to an outsourcing private decryption key $osk_{GID}$, the element R being expressed as:

$$R = \frac{C_0}{(CT')^{osk_{GID}}};$$

calculating the element $R_0$ according to the element R, the element $R_0$ being expressed as:

$R_0 = H_0(R);$ verifying an integrity verification value through a following equation:

$V = H_2(R_0 | CT_{sym});$ calculating a symmetric decryption key $K_{sym}$ upon verification, the symmetric decryption key $K_{sym}$ being calculated by:

$Ksym = H_1(R);$ and performing symmetric decryption on the semi-decrypted ciphertext CT' according to the symmetric decryption key $K_{sym}$ to obtain the plaintext data MSG.

Preferably, the searching, by the attribute authority through a white-box traceback algorithm in response to key leakage, an identity of a data user corresponding to a leaked key may include: verifying whether a structure of the decryption key satisfies a standard through a following equation:

$K_{1,i}, K_{2,i} \in G;$ $K_{3,i}, GID \in Z_P^*;$ determining, if yes, whether a following equation is satisfied;

$e(K_{1,i}, g^{aj} g^{bj \cdot K_{3,i}} g^{GID}) = e(g,g)^{\alpha i} e(H(GID), g^{\beta i});$ and outputting an identity number GID if yes, the identity number GID being an identity number of a data user leaking the key.

If the legal data user leaks an own private key to an illegal data user, the right and interest of the data owner are damaged. In the above implementation, the white-box traceback algorithm is used to trace an identity to realize accountability in key leakage.

The ABE method with multiple tracing attribute authorities for cloud-assisted IoT provided by the present disclosure has the following advantages:

1. By encrypting plaintext data through symmetric encryption, the present disclosure improves the efficiency and practicability of encryption and is adaptive to massive data scenarios.
2. A ciphertext is uploaded to a cloud storage center, the cloud storage center performs semi-decryption on the ciphertext, and a data user decrypts a semi-decrypted ciphertext, so the present disclosure greatly relieves a decryption burden of the data user, and is applied to resource-limited IoT devices.
3. A data owner configures an access structure, and encrypts a symmetric key through a hidden access structure, namely controls the data user through the access structure, so the present disclosure realizes one-to-many sharing of the symmetric key, ensures security of the symmetric key, and prevents access of an illegal data user. Meanwhile, the present disclosure prevents privacy leakage arising from transmission of the plaintext in the access control structure, and is particularly applied to the privacy-sensitive IoT field such as the medical IoT.
4. If the legal data user leaks an own private key to an illegal data user, the right and interest of the data owner are damaged. In response to key leakage, the attribute authority can search, through a white-box traceback algorithm, an identity of a data user corresponding to a leaked key, thereby realizing the accountability.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and those of ordinary skill in the art would also be able to derive other accompanying drawings from these accompanying drawings without creative efforts.

The present disclosure is further described with reference to the accompanying drawings.

DETAILED DESCRIPTION OF THE EMBODIMENTS

The present disclosure is described in further detail below in combination with the accompanying drawings and specific embodiments so as to enable those skilled in the art to better understand and implement the present disclosure, and the illustrated embodiments should not be construed as any limitation to the present disclosure. Embodiments and technical features in the embodiments of the present disclosure may be combined with each other without any conflict.

It is to be understood that terms such as "first" and "second" in the description of the present disclosure are merely for distinguishing the description, rather than understanding as indicating or implying a relative importance, or indicating or implying a sequence. In the embodiments of the present disclosure, "a plurality of" means at least two.

The present disclosure provides an ABE method with multiple tracing attribute authorities for cloud-assisted IoT, to realize secure, decryption outsourced and leakage traced ABE with the multiple attribute authorities.

Embodiment

Figure 1:
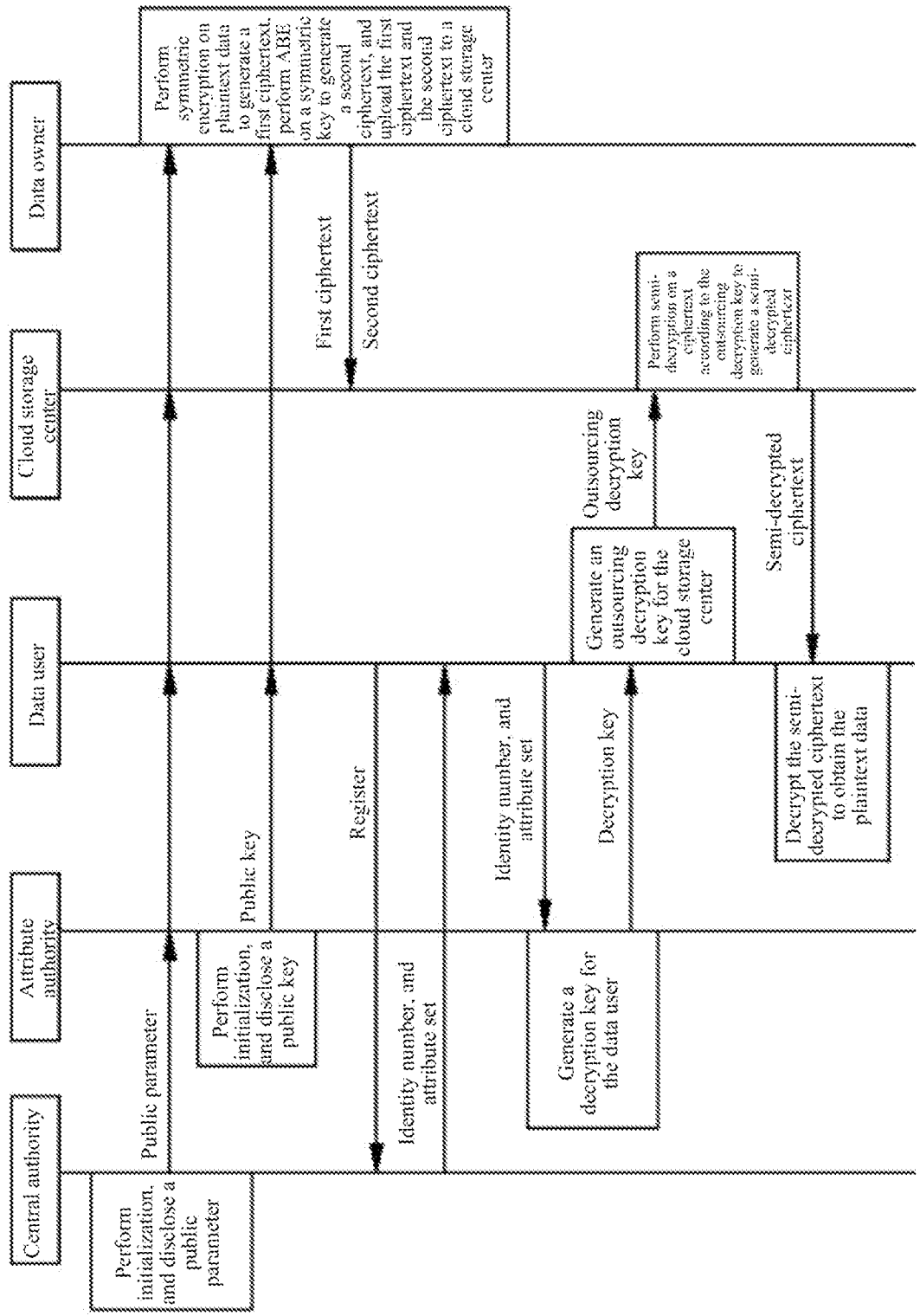
FIG. 1 is a flowchart of an ABE method with multiple tracing attribute authorities for cloud-assisted IoT according to an embodiment of the present disclosure.

As shown in FIG. 1, the ABE method with multiple tracing attribute authorities for cloud-assisted IoT provided by the present disclosure includes the following steps:

S100: A central authority performs system initialization to generate a public parameter and discloses the public parameter.

S200: Each of attribute authorities performs initialization based on the public parameter to generate a key pair, and discloses a public key in the key pair.

S300: A data owner performs symmetric encryption on plaintext data according to a symmetric key to generate a first ciphertext, generates an integrity verification value according to the first ciphertext, performs ABE on the symmetric key based on a hidden access structure to generate a second ciphertext, and uploads the first ciphertext, the second ciphertext and the integrity verification value to a cloud storage center.

S400: A data user requests a decryption key to the attribute authority according to an own attribute, generates an outsourcing decryption key based on the decryption key and a restored hidden access structure, and sends the outsourcing decryption key to the cloud storage center.

S500: The cloud storage center performs semi-decryption on a ciphertext according to the outsourcing decryption key to generate a semi-decrypted ciphertext and feeds the semi-decrypted ciphertext back to the data user.

S600: The data user decrypts the semi-decrypted ciphertext according to a private decryption key to obtain the plaintext data.

S700: The attribute authority searches, through a white-box traceback algorithm in response to key leakage, an identity of a data user corresponding to a leaked key.

In Step S100, a security parameter $\lambda$ is input, and two p-order multiplicative groups $G$ and $G_T$ are selected, where $g$ is a generator of the $G$. A symmetric bilinear map $e:G \times G \rightarrow G_T$ is selected. Four collision-resistant hash functions $H$, $H_0$, $H_1$, and $H_2$ are selected, specifically: $H:\{0,1\} \rightarrow G$, $H_0:G_T \rightarrow \{0,1\}^{nH_0}$, $H_1:G_T \rightarrow \{0,1\}^*$, $H_2:\{0,1\}^* \rightarrow \{0,1\}^{nH_2}$. The central authority is initialized to generate the public parameter PP, the public parameter PP being expressed as: $PP=\{G, G_T, p, e, g, H, H_0, H_1, H_2\}$.

In Step S200, each of attribute authorities performs initialization based on the public parameter PP. With initialization of a jth attribute authority $AA_j$ as an example, the step includes: Three elements $h_j$, $a_j$ and $b_j$ are randomly selected from a group $Z_P^*$, the group $Z_P^*$ being a group consisting of modulo-p integers without an integer 0. For each of attributes i in an attribute set $S_{AAj}$ controlled by the attribute authority $AA_j$, two elements $\alpha_i$ and $\beta_i$ are randomly selected from the group $Z_P^*$. A key pair $(PK_{AAJ}, SK_{AAj})$ of the jth attribute authority is generated according to the parameters $h_j$, $a_j$, $b_j$, $\alpha_i$ and $\beta_i$, the key pair $(PK_{AAJ}, SK_{AAj})$ being expressed as:

$$PK_{AAJ} = \left( \{g^{\alpha_i}, g^{\beta_i}\}_{i \in S_{AAj}}, g^{hj}, g^{\alpha_j}, g^{b_j} \right)$$

$$SK_{AAJ} = \left( \{\alpha_i, \beta_i\}_{i \in S_{AAj}}, hj, \alpha_j, b_j \right).$$

In Step S300, a data owner encrypts plaintext data to generate a ciphertext, and uploads the ciphertext to a cloud storage center. Specifically, the step includes:

S311: An element R is randomly selected from the multiplicative group $G_T$, and a symmetric key $K_{sym}$ and a parameter $R_0$ are calculated based on the element R and the collision-resistant hash functions $H_0$ and $H_1$, both the symmetric key and the element being respectively pressed as:

$K{sym}=H_1(R)$ $R_0=H_0(R)$.

S312: Symmetric encryption is performed on the plaintext data MSG according to the symmetric key $K_{sym}$ to generate the ciphertext $CT_{sym}$.

Upon generation of the ciphertext $CT_{sym}$, an integrity verification value V is further calculated through Step S320, specifically:

S320: A verification value V is calculated through the collision-resistant hash function $H_2$ based on the ciphertext $CT_{sym}$ and the element $R_0$, the verification value V being expressed as:

$V=H_2(R_0|CT_{sym})$.

In order to ensure the security of the symmetric key, and enable a data user having an access right to own the symmetric key, ABE is performed on the symmetric key $K_{sym}$ based on a hidden access structure. Specifically, the element R for calculating the symmetric key $K_{sym}$ is hidden as follows:

S331: An access structure $(M, \rho)$ is hidden according to a one-way anonymous key agreement protocol, and the hidden access structure $(M, \rho)$ is converted into an LSSS access matrix, a replacement value $q_i$ for an ith attribute in the hidden access structure $(M, \rho)$ being expressed as:

$q_i = e^{(hj \cdot a_j H(i))}$, where, $g^{hj}$ is a parameter of a public key $PK_{AAJ}$ of the jth attribute authority, and $H(i)$ is a hash value of the ith attribute.

S332: An element s is randomly selected from the group $Z_P^*$ as a shared key seed, and two random vectors $\vec{v}$ and $\vec{w}$ are generated, $\vec{v}$ and $\vec{w}$ being respectively expressed as:

$\vec{v}=[s, v_1, \ldots, v_n] \in Z^{p^n}$ $\vec{w}=[0, w_1, \ldots, w_n] \in Z^{p^n}$.

S333: An element $p_i$ is randomly selected from the group $Z_P^*$ for each row $M_i$ in the access matrix, and following two elements are calculated:

$\lambda_i = M_i \times \vec{v}$ $w_i = M_i \times \vec{w}$.

S334: The ABE is performed on the element R to generate the ciphertext $CT_{ABE}$, the ciphertext $CT_{ABE}=(h, C_0, \{C_{1,i}, C_{2,i}, C_{3,i}, C_{4,i}, C_{5,i}\}_{i \in [1,l]})$ being expressed as:

$h=g^a$ $C_0 = R \cdot e(g,g)^s$ $C_{1,i} = g^{\lambda_i} g^{\alpha_{\rho_i} p_i}$ $C_{2,i}=g^{p_i}$ $C_{3,i}=g^{w_i}g^{\beta_{p_i}p_i}$ $C_{4,i}=g^{a_j p_i}$ $C_{5,i}=g^{b_j p_i}$ The ciphertext $CT_{sym}$, the integrity verification value V and the ciphertext $CT_{ABE}$ are uploaded to the cloud storage center.

In Step S400, a data user requests a decryption key to the attribute authority, which specifically includes:

S411: A data user is registered to the central authority, and the central authority feeds an identity back to a legal data user, the identity including an identity number GID and an attribute set $S_{GID}$.

S412: The data user requests the decryption key to the attribute authority, the attribute authority generating the decryption key for a controlled attribute in the attribute set $S_{GID}$. For the ith attribute, an element r is randomly selected from a group $$Z_P \backslash \left\{ -\frac{a_j + GID}{b_j} \right\};$$

to calculate a decryption key, and a decryption key $sk_{\{GID, j\}} = (K_{1,i}, K_{2,i}, K_{3,i})$ corresponding to the jth attribute authority is expressed as:

$$K_{1,i} = g^{\frac{\alpha i}{a_j + GID + b_j}} H(GID)^{\frac{\tau i}{a_j + GID + b_j}}$$

$K_{2,i}=H(i)^{t_j}$ $K_{3,i}=r$

S413: The data user receives corresponding decryption keys from multiple attribute authorities. Decryption keys of all attribute authorities are combined to generate a final decryption key $sk_{GID}$.

Upon generation of the decryption key, Step S420 is proceeded to generate an outsourcing decryption key, which specifically includes:

S421: A restored value is calculated for each of attributes in the access structure, and a corresponding attribute in the hidden access structure is replaced with the restored value. With the ith attribute as an example, a restored value is calculated by:

$q_i'=e(h,H(i)^{t_j})$.

S422: The data user searches a subscript set $L'= \{i:(\rho_{(i)} \cap S'_{GID})_{i \in [l]}\}$ of decrypting attributes in the attribute set $S_{SID}$ according to a restored access structure.

S423: An element z is randomly selected from the group $Z_P^*$, and the outsourcing decryption key $ok_{GID}$ is calculated based on the element z, the outsourcing decryption key $ok_{GID} = (opk_{GID}, osk_{GID})$ being expressed as:

$$opk_{GID} = \left( \left\{ K_{1,i}^{\frac{1}{z}} \right\}_{i \in L'}, g^{\frac{1}{z}}, H(GID)^{1/z} \right)$$

$osk_{GID}=z$.

After the outsourcing decryption key is obtained, Step S500 is proceeded to perform semi-decryption on a ciphertext through the cloud storage center, which specifically includes:

S510: A following equation is calculated with the outsourcing decryption key $ok_{GID}$:

$$Q = \frac{e\left(g^{\frac{1}{z}}, C_{1,i}\right) e\left(H(GID)^{\frac{1}{z}}, C_{3,i}\right)}{e\left(g^{\frac{\alpha i}{Z(a_j+GID+b_j \cdot r)}} H(GID)^{\frac{\beta}{Z(a_j+GID+b_j \cdot r)}}, C_{2,i}^{K_3} C_{4,i} C_{5,i}^{K_{4,i}}\right)}.$$

S520: A set of constants $\{c_i\}_{i \in [1,l]} \in Z_p$ are searched, a semi-decrypted ciphertext CT' is calculated according to $\Sigma_{i=1}^{l} c_i M_i = [1,0,\ldots,0]$, and the semi-decrypted ciphertext is fed back to the data user.

$$CT' = \prod_{i=1}^{l} Q^{c_i} = e(g, g)^{s/z}$$

Upon the semi-decryption of the cloud storage center, the data user decrypts the semi-decrypted ciphertext to obtain the plaintext data, which specifically includes:

S610: The data user calculates the element R according to the outsourced decrypting key $osk_{GID}$, the element R being expressed as:

$$R = \frac{C_0}{(CT')^{osk_{GID}}}.$$

S620: The element $R_0$ is calculated according to the element R, the element $R_0$ being expressed as:

$R_0=H_0(R)$.

S630: A verification value is verified through a following equation:

$V=H_2(R_0|CT_{sym})$.

S640: Upon verification of the verification value, a symmetric decryption key $K_{sym}$ is calculated, the decryption key $K_{sym}$ being calculated by:

$K_{sym}=H_1(R)$.

S650: Symmetric decryption is performed on the semi-decrypted ciphertext CT' according to the decryption key $K_{sym}$ to obtain the plaintext data MSG.

Step S700 includes:

S710: Whether a structure of the decryption key satisfies a standard through a following equation:

$K_{1,i}, K_{2,i} \in G$;

$K_{3,i}, GID \in Z_P^*$.

S720: If yes, whether a following equation is satisfied is determined:

$e(K_{1,i}, g^{a_j} g^{b_j * K_{3,i}} g^{GID}) = e(g,g)^{\partial i} e(H(GID), g^{\beta_i})$.

S730: An identity number GID is output if yes, the identity number GID being an identity number of a data user leaking the key.

In the embodiment, pseudo-random permutation is used to simulate true random selection.

In the embodiment, the ABE in Step S300 and the attribute-based decryption in Step S500 and Step S600 are based on decisional bilinear Diffie-Hellman (DBDH). The security of the decryption key and the outsourcing decryption key in Step S400 is based on a discrete logarithm (DL) hypothesis.

If the legal data user leaks an own private key to an illegal data user, the right and interest of the data owner are damaged. The white-box traceback algorithm is used to trace an identity to realize accountability in key leakage.

Figure 2:
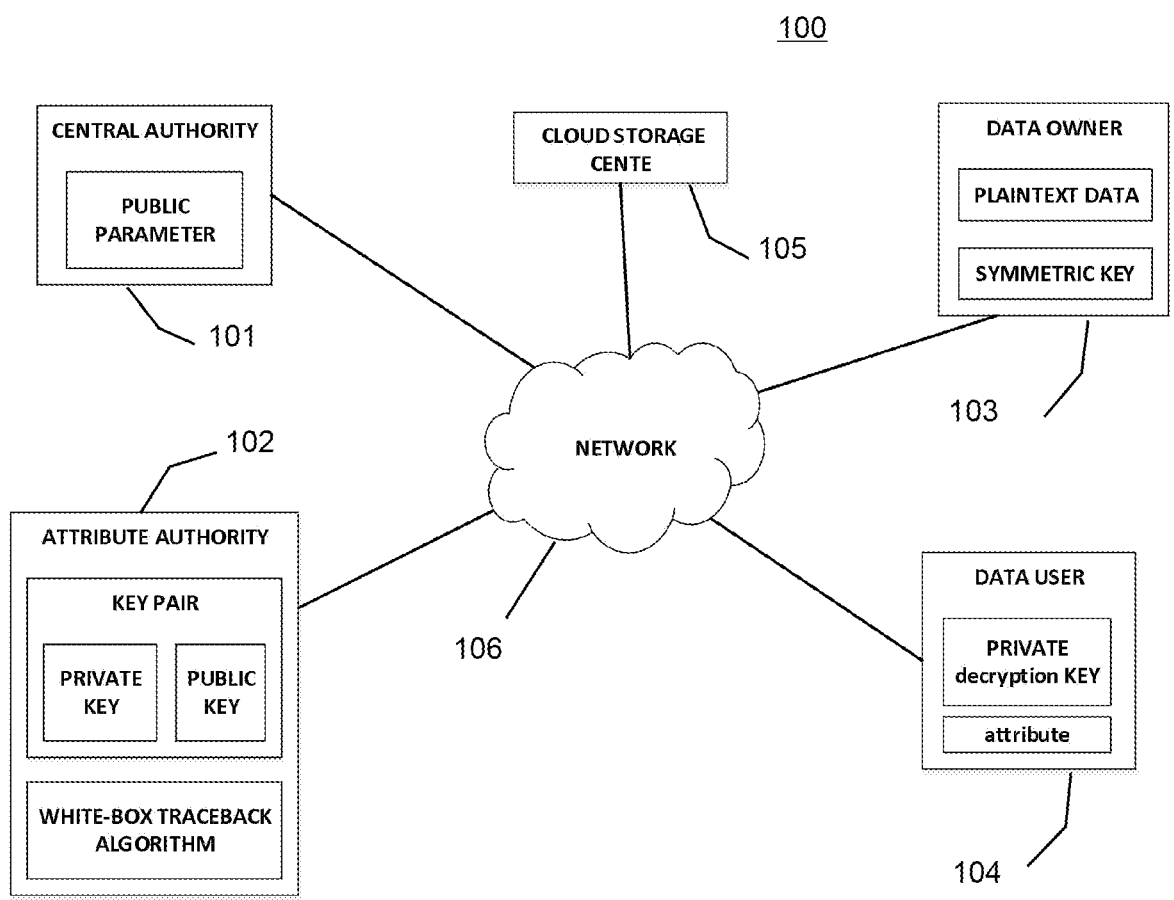
FIG. 2 is an architecture diagram of a system for performing the ABE method of the present disclosure.

FIG. 2 is an architecture diagram of a system 100 for performing the ABE method of the present disclosure. The central authority 101, the attribute authority 102, the data owner 103, the data user 104 and the cloud storage center 105 may be communicatively coupled together via network 106. Network may be a wired network wireless network or combination of the wired and wireless networks. Network may be a local area network a corporate intranet a wide area network or the Internet.

The data user and data owner may be a user device with clients, including but not limited to a desktop, a laptop, a netbook, a tablet, a smartphone, a mobile device, and/or any other type of computing system in accordance with one or more example embodiments. The cloud storage center may be a cloud-based server, a server, a workstation and/or any other type of an Elastic Compute Service (ESC).

The central authority and the attribute authority may be computing devices or servers at least including a processing unit (processors) and a storage.

The aforementioned embodiments are only preferred embodiments illustrated for fully explaining the present disclosure, and the claimed scope of the present disclosure is not limited thereto. Equivalent substitutions or transformations made by those skilled in the art on the basis of the present disclosure are both within the claimed scope of the present disclosure. The claimed scope of the present disclosure shall be determined by the claims.

What is claimed is:

1. An attribute-based encryption (ABE) method with multiple tracing attribute authorities for cloud-assisted Internet-of-things (IoT), comprising the following steps:
    performing, by a central authority, system initialization to generate a public parameter and disclosing the public parameter;
    performing, by each of attribute authorities, initialization based on the public parameter to generate a key pair, wherein the public parameter PP is expressed as: $PP=\{G, G_T, p, e, g, H, H_0, H_1, H2\}$, wherein G and $G_T$ each are a multiplicative group of a prime order p, and g is a generator of G; e is a symmetric bilinear map, $e:G \times G \to G_T$;
    and H, $H_0$, H1, and H2 each are a collision-resistant hash function, $H:\{0,1\} \to G$, $H_0:G_T \to \{0,1\}^{nH_0}$, $H_1:G_T \to \{0,1\}^*$, $H_2:\{0,1\}^* \to \{0,1\}^{nH_2}$, and disclosing a public key in the key pair; performing, by a data owner, symmetric encryption on plaintext data according to a symmetric key to generate a first ciphertext, generating an integrity verification value according to the first ciphertext, performing ABE on the symmetric key based on a hidden access structure to generate a second ciphertext, and uploading the first ciphertext, the second ciphertext and the integrity verification value to a cloud storage center; requesting, by a data user, a decryption key to the attribute authority according to an own attribute, generating an outsourcing decryption key based on the decryption key and a restored hidden access structure, and sending the outsourcing decryption key to the cloud storage center; performing, by the cloud storage center, semi-decryption on a ciphertext according to the outsourcing decryption key to generate a semi-decrypted ciphertext and feeding the semi-decrypted ciphertext back to the data user; decrypting, by the data user, the semi-decrypted ciphertext according to a private decryption key to obtain the plaintext data; and searching, by the attribute authority through a white-box traceback algorithm in response to key leakage, an identity of a data user corresponding to a leaked key.

2. The ABE method according to claim 1, wherein the performing, by a jth attribute authority $AA_J$, initialization based on the public parameter PP comprises: randomly selecting three elements h, a and b, from a group $Z_p^*$; randomly selecting, for each of attributes i in an attribute set $SA_y$ controlled by the attribute authority $AA_J$, two elements a, and fl from the group $Z_O$; and generating a key pair (PKAu, $SKA_y$) of the jth attribute authority AA, according to the parameters h, a, b, a, and fl, the key pair (PKAu, SKAA) being expressed as:

$$PK_{AAJ}=(\{g^{\alpha_i},g^{\beta_i}\}_{i \in S_{AAj}},g^{hj},g^{aj},g^{bj})$$

$$SK_{AAJ}=(\{\alpha_i,\beta_i\}_{i \in S_{AAj}},hj,\alpha_j,b_j).$$

3. The ABE method according to claim 2, wherein the performing, by a data owner, symmetric encryption on plaintext data according to a symmetric key to generate a first ciphertext comprises:
    randomly selecting an element R from the multiplicative group $G_T$, and calculating the symmetric key $K_{sym}$ and a parameter $R_0$ based on the element R and the collision-resistant hash functions $H_0$ and $H_1$, both the symmetric key and the parameter being respectively pressed as:

$$K\text{sym}=H_1(R)$$

$$R_0=H_0(R); \text{ and}$$

performing the symmetric encryption on the plaintext data MSG according to the symmetric key $K_{sym}$ to generate the ciphertext $CT_{sym}$, and generating the integrity verification value, the integrity verification value V being expressed as:

$$V=H_2(R_0|CT_{sym}).$$

4. The ABE method according to claim 3, wherein the performing ABE on the symmetric key based on the hidden element R in a hidden access structure to generate a second ciphertext, the element R being used to calculate the symmetric key $K_{sym}$, comprises:
    hiding an access structure (M, ρ) according to a one-way anonymous key agreement protocol, and converting the hidden access structure (M, ρ) into a linear secret sharing scheme (LSSS) access matrix, a replacement value $q_i$ for an ith attribute in the hidden access structure (M, ρ) being expressed as:

$$q_i=e(g^{hj \cdot a},H(i)),$$

wherein, $g^{hj}$ is a parameter of a public key $PK_{AAJ}$ of the jth attribute authority, and H(i) is a hash value of the ith attribute;
    randomly selecting an element s from the group $Z_P^*$ as a shared key seed, and generating two random vectors $\vec{v}$ and $\vec{w}$, $\vec{v}$ and $\vec{w}$ being respectively expressed as:

$$\vec{v}=[s, v_1, \ldots, v_n] \in Z_p^n$$

$$\vec{w}=[0, w_1, \ldots, w_n] \in Z_p^n;$$

randomly selecting an element $p_i$ from the group $Z_P^*$ for each row $M_i$ in the access matrix, and calculating following two elements:

$$\lambda_i = M_i \times \vec{v}$$

$$w_i = M_i \times \vec{w}; \text{ and}$$

performing the ABE on the element R to generate the ciphertext $CT_{ABE}$, the ciphertext $CT_{ABE} = (h, C_0, \{C_{1,i}, C_{2,i}, C_{3,i}, C_{4,i}, C_{5,i}\}_{i \in [1,l]})$ being expressed as:

$$h = g^a$$

$$C_0 = R \cdot e(g,g)^s$$

$$C_{1,i} = g^{\lambda_i} g^{\alpha_{\rho_i} p_i}$$

$$C_{2,i} = g^{p_i}$$

$$C_{3,i} = g^{w_i} g^{\beta_{\rho_i} p_i}$$

$$C_{4,i} = g^{a_j \cdot p_i}$$

$$C_{5,i} = g^{b_j \cdot p_i}.$$

5. The ABE method according to claim 4, wherein the requesting, by a data user, a decryption key to the attribute authority according to an own attribute comprises:
  making a data user registered to the central authority; and feeding, by the central authority, an identity back to a legal data user, the identity comprising an identity number GID and an attribute set $S_{GID}$;
  requesting, by the data user, the decryption key to the attribute authority, the attribute authority generating the decryption key for a controlled attribute in the attribute set $S_{GID}$, and a decryption key $sk_{\{GID,j\}} = (K_{1,i}, K_{2,i}, K_{3,i})$ generated by the jth attribute authority for the data user having the identity number of GID being expressed as:

$$sk_{\{GID,j\}} = (K_{1,i}, K_{2,i}, K_{3,i})$$

$$K_{2,i} = H(i)^{hj}$$

$$K_{3,i} = r,$$

wherein, an element r is an element randomly selected from a group $$Z_P \setminus \left\{ -\frac{a_j + GID}{b_j} \right\};$$

and
  combining the decryption key corresponding to the attribute authority to form a final decryption key $sk_{GID}$.

6. The ABE method according to claim 5, wherein the generating, by the data user, an outsourcing decryption key based on the decryption key and a restored hidden access structure comprises:
  restoring, by the data user, the hidden access structure, a restored value $q_i'$ of the ith attribute in the restored hidden access structure being expressed as:

$$q_i' = e(h, H(i)^{hj});$$

searching, by the data user, a subscript set $L' = \{i : (\rho_{(i)} \cap S'_{GID})_{i \in [1]}\}$ of decrypting attributes in the attribute set $S_{GID}$ according to the restored access structure; and randomly selecting an element z from the group $Z_P^*$, and calculating an outsourcing decryption key pair $ok_{GID}$ based on the element z, the outsourcing decryption key pair $ok_{GID} = (opk_{GID}, osk_{GID})$ being expressed as:

$$opk_{GID} = \left( \left\{ K_{1,i}^{\frac{1}{z}} \right\}_{i \in L'}, g^{\frac{1}{z}}, H(GID)^{1/z} \right)$$

$$osk_{GID} = z.$$

7. The ABE method according to claim 6, wherein the semi-decrypted ciphertext CT' is expressed as:

$$CT' = \prod_{i=1}^{l} Q^{c_i} = e(g,g)^{s/z}$$

$$Q = \frac{e\left(g^{\frac{1}{z}}, C_{1,i}\right) e\left(H(GID)^{\frac{1}{z}}, C_{3,i}\right)}{e\left(g^{\frac{\alpha_i}{z(a_j+GID+b_j \cdot r)}} H(GID)^{\frac{\beta}{z(a_j+GID+b_j \cdot r)}}, C_{2,i}^{K_3} C_{4,i} C_{5,i}^{K_{4,i}}\right)},$$

wherein, a constant $\{c_i\}_{i \in [1,l]} \in Z_P$, and the constant $\{c_i\}_{i \in [1,l]} \in Z_P$ satisfies $\Sigma_{i=1}^{l} c_i M_i = [1,0,\ldots,0]$.

8. The ABE method according to claim 7, wherein the decrypting, by the data user, the semi-decrypted ciphertext according to a private decryption key comprises:
  calculating, by the data user, the element R according to an outsourcing private decryption key $osk_{GID}$, the element R being expressed as:

$$R = \frac{C_0}{(CT')^{osk_{GID}}};$$

calculating the element $R_0$ according to the element R, the element $R_0$ being expressed as:

$$R_0 = H_0(R);$$

verifying an integrity verification value through a following equation:

$$V = H_2(R_0 | CT_{sym});$$

calculating a symmetric decryption key $K_{sym}$ upon verification, the symmetric decryption key $K_{sym}$ being calculated by:

$$K_{sym} = H_1(R); \text{ and}$$

performing symmetric decryption on the semi-decrypted ciphertext CT' according to the symmetric decryption key $K_{sym}$ to obtain the plaintext data MSG.

9. The ABE method according to claim 1, wherein the searching, by the attribute authority through a white-box traceback algorithm in response to key leakage, an identity of a data user corresponding to a leaked key comprises:
  verifying whether a structure of the decryption key satisfies a standard through a following equation:

$$K_{1,i}, K_{2,i} \in G;$$

$$K_{3,i}, GID \in Z_P^*;$$

determining, if yes, whether a following equation is satisfied:

$$e(K_{1,i}, g^{\alpha_j} g^{b_j * K_{3,i}} g^{GID}) = e(g,g)^{\partial_i} e(H(GID), g^{\beta_i}); \text{ and}$$

10. The ABE method according to claim 1, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

11. The ABE method according to claim 2, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

12. The ABE method according to claim 3, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

13. The ABE method according to claim 4, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

14. The ABE method according to claim 5, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

15. The ABE method according to claim 6, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

16. The ABE method according to claim 7, wherein the searching, by the attribute authority through a white-box traceback algorithm in response to key leakage, an identity of a data user corresponding to a leaked key comprises:
verifying whether a structure of the decryption key satisfies a standard through a following equation:

$K_{1,i}, K_{2,i} \in G$;

$K_{3,i}, GID \in Z_P^*$;

determining, if yes, whether a following equation is satisfied;

$e(K_{1,i}, g^{aj} g^{bj*K3,i} g^{GID}) = e(g,g)^{\partial i} e(H(GID), g^{\beta i})$; and outputting an identity number GID if yes, the identity number GID being an identity number of a data user leaking the key.

* * * * *